United States Patent [19]
Strauss

[11] 3,944,058
[45] Mar. 16, 1976

[54] BOTTLE CONVEYOR SYSTEM INCLUDING ADJUSTABLE HEIGHT CONTINUOUS BELT CONVEYOR AND POSITIVE LOCK SPRAY SHIELDED ROTATABLE BOTTLE CARRIER

[75] Inventor: Leopold Strauss, East Rockaway, N.Y.

[73] Assignee: Indian Head Inc., New York, N.Y.

[22] Filed: May 6, 1974

[21] Appl. No.: 467,398

Related U.S. Application Data

[62] Division of Ser. No. 352,682, April 19, 1973, Pat. No. 3,860,104.

[52] U.S. Cl. ............... 198/179; 198/131; 214/1 BA; 294/115; 294/116
[51] Int. Cl.² ........................................ B65G 19/00
[58] Field of Search ............... 198/179, 131, 22 B; 294/116, 115, 87 R, 87.22, 87.24; 214/1 BA, 309

[56] References Cited
UNITED STATES PATENTS

| | | | |
|---|---|---|---|
| 1,002,709 | 9/1911 | Kromann | 294/115 X |
| 2,014,807 | 9/1935 | Keyzer | 294/116 X |
| 2,899,232 | 8/1959 | Walter | 294/116 X |
| 3,863,753 | 2/1975 | Shank | 198/179 |

*Primary Examiner*—John J. Love
*Assistant Examiner*—Douglas D. Watts
*Attorney, Agent, or Firm*—Brumbaugh, Graves, Donohue & Raymond

[57] ABSTRACT

A continuous belt conveyor for transporting bottles to be processed includes an inclined ramp portion for elevating bottles to a moving horizontal platform portion, screw means for selectively adjusting the height of the moving horizontal platform portion without varying the length or tension of the conveyor belt, a variable pitch horizontally disposed screw guide for uniformly spacing bottles as they enter upon the moving horizontal platform, and a plurality of uniformly spaced neck gripping overhead bottle carriers mounted on a continuous overhead chain moving in synchronism with the conveyor belt, with overhead cam means adjacent to the junction between the inclined ramp portion and the horizontal platform portion of the conveyor belt for causing the overhead bottle grippers to be successively elevated over, aligned with, and then lowered onto neck locking engagement with individual bottles passing therebeneath. The overhead bottle grippers comprise a clam shell type of structure opened when elevated and closed when lowered and a surrounding rotatable cylindrical shield which holds the clam shells in locked position when lowered thereover and which also by engagement with a suitable rack produces a rotation of the bottles as they are carried thereby through a spray processing station. A synchronous drive mechanism including a feedback loop between the conveyor belt and the overhead chain conveyor maintains constant speed and physical relationship between the two continuously moving conveyor means.

6 Claims, 10 Drawing Figures

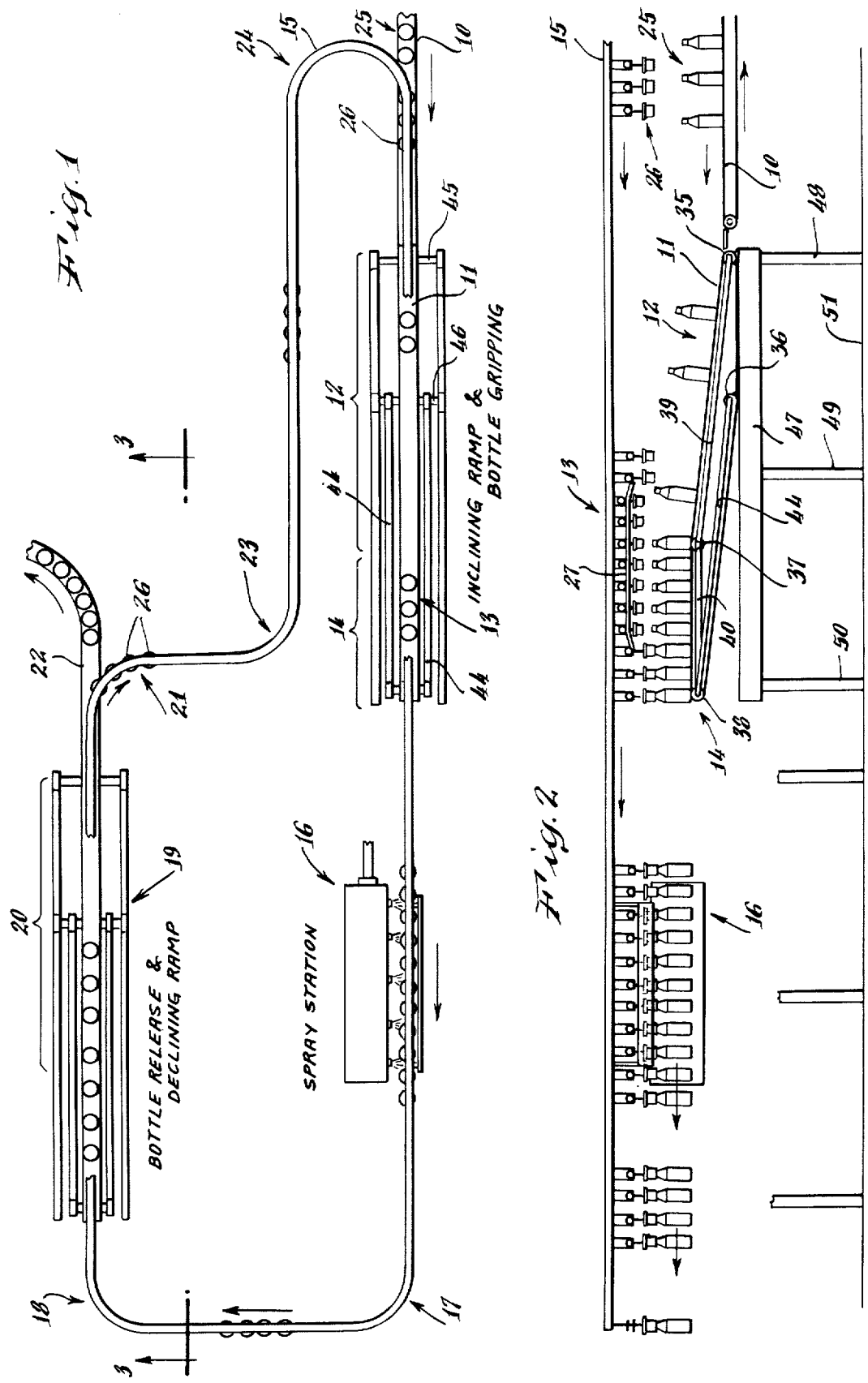

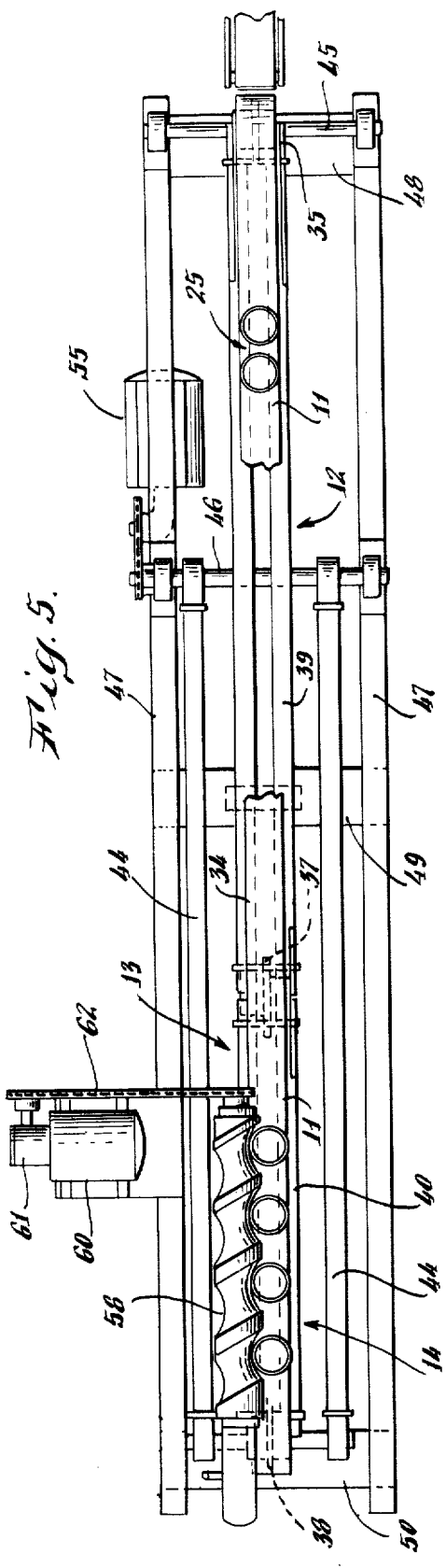
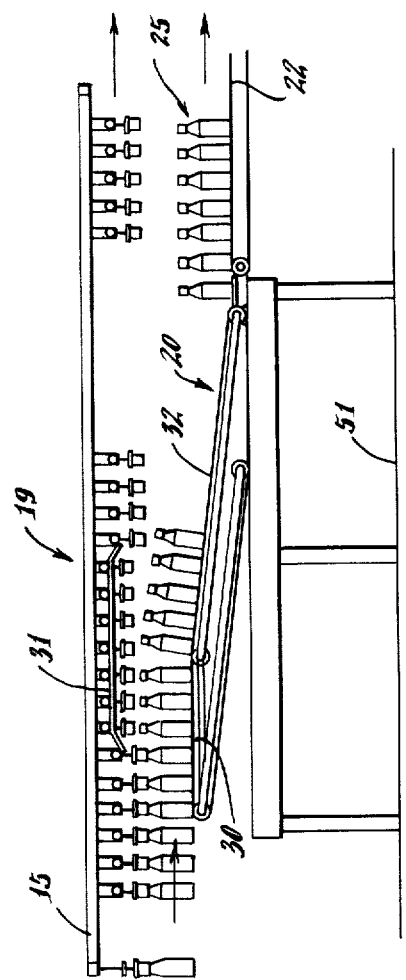

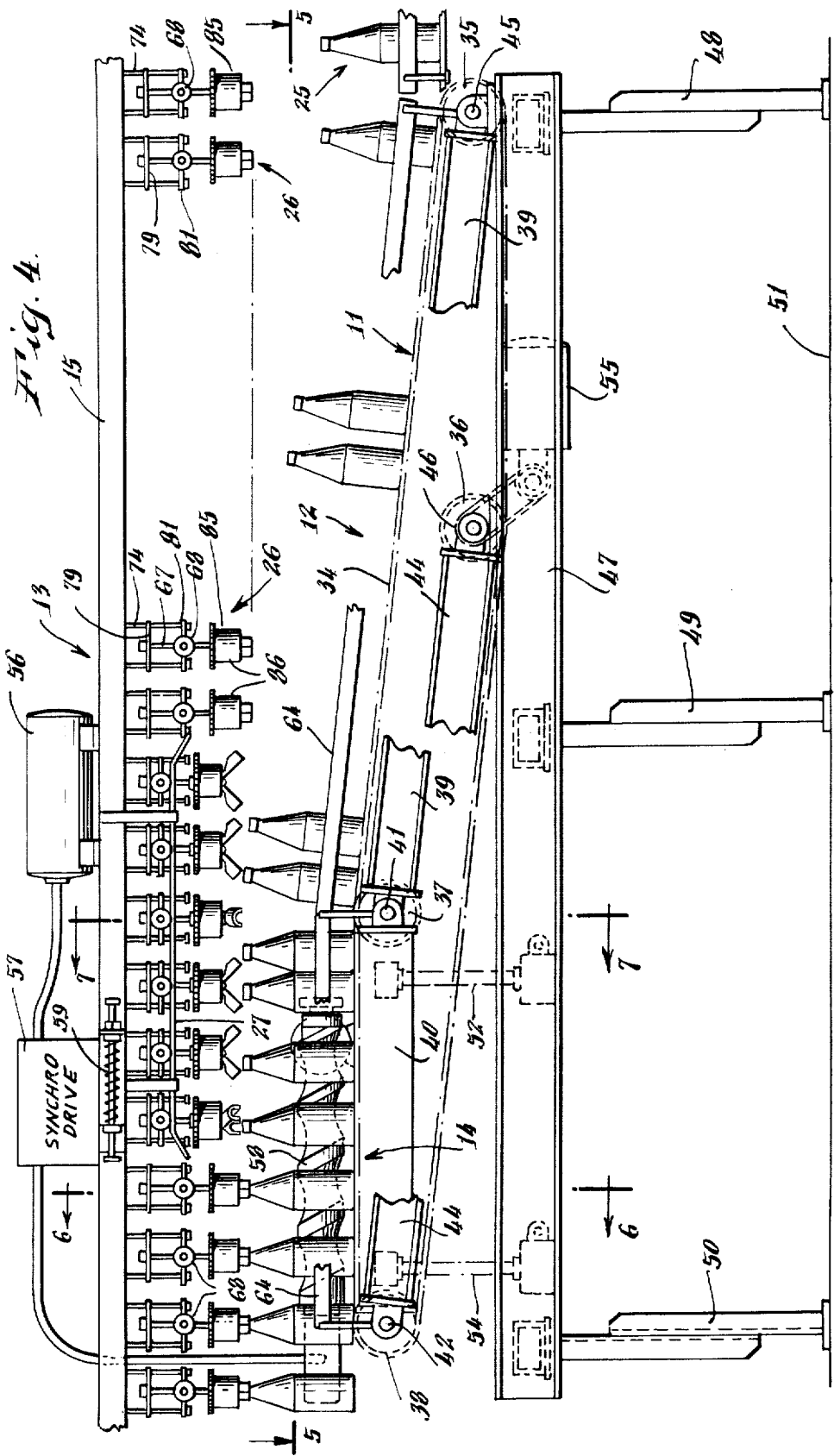

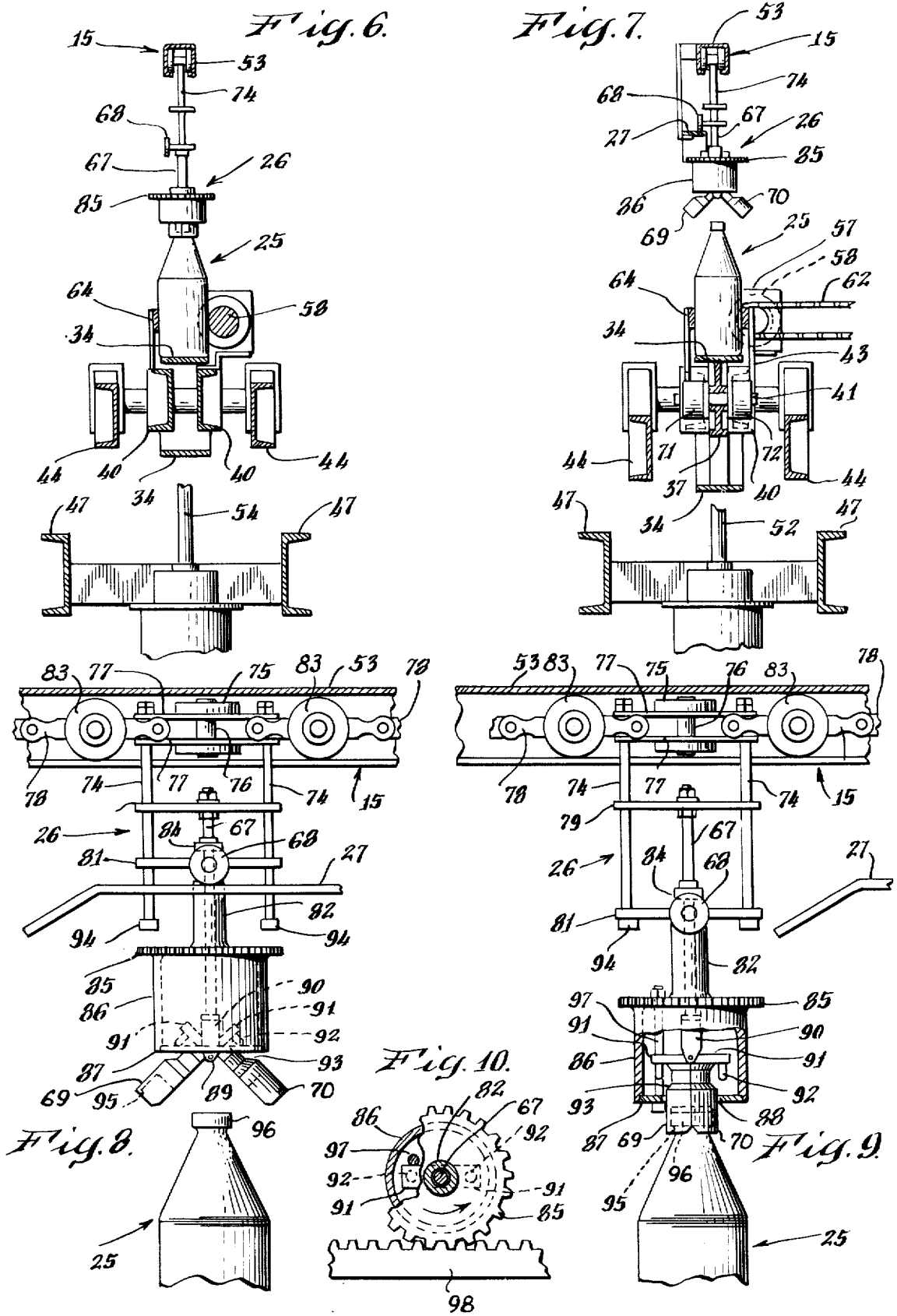

BOTTLE CONVEYOR SYSTEM INCLUDING ADJUSTABLE HEIGHT CONTINUOUS BELT CONVEYOR AND POSITIVE LOCK SPRAY SHIELDED ROTATABLE BOTTLE CARRIER

This is a division, of application Ser. No. 352,682, filed Apr. 19, 1973 now U.S. Pat. No. 3,860,104.

The foregoing abstract is not to be taken either as a complete exposition or as a limitation of the present invention. In order to understand the full nature and extent of the technical disclosure of this application, reference must be had to the following detailed description and the accompanying drawings as well as to the claims.

BACKGROUND OF THE INVENTION

In prior art conveyor systems for handling bottles in spraying or other processing operations, it has always been a problem to adjust the system for different sizes and different heights of bottles. Where adjustable platforms have been provided, it has been necessary to have these isolated from the inclined conveyor belt carrying bottles thereto with a dead space transfer point between the inclined conveyor and the separate horizontal conveyor. This causes problems of bottles knocking inasmuch as each bottle as it enters the dead space becomes stationary until it is pushed thereoff by the next bottle behind it and that in turn, in addition to the problems of breaking or surface marring, has interferred with means for uniformly spacing bottles beneath the overhead carriers. In the present invention a continuous belt passing over a total of 4 rollers includes an inclined portion which is contiguous with a horizontal portion thereby eliminating this problem of dead space transfer. The horizontal portion is mounted on two screw jacks so that it may be raised or lowered and this is accomplished without increasing or otherwise varying the tension or length of the continuous conveyor belt. The path traversed by the belt in the present invention defines a parallelogram having an upper horizontal portion, a lower horizontal portion and upper and lower angularly inclined portions. The path length of the conveyor belt remains constant regardless of the height of the upper horizontal portion.

Furthermore, while various neck gripping bottle carriers have been devised heretofore, they have all had some limitations such as for example requiring that the clam shells be particularly oriented so that the bottle necks enter the open side before the clam shells are closed, and also with the prior art overhead carriers there has been no provision for protecting the carrier structure from spray materials which may be applied to the bottles, thus giving rise to accumulated deposits which ultimately interfere with the normal and proper functioning of the bottle gripping members. The present invention overcomes these drawbacks of the prior art by providing means for dropping the overhead conveyors onto aligned bottles therebeneath without requiring particular angular orientation of the neck gripping clam shell bottle carriers. Additionally, in the present invention the overhead bottle carrier devices are provided with an external cylindrical shield member which functions not only to lock the clam shell grippers on the necks of the bottles but also to protect the clam shell gripping mechanism from the deleterious effects of accumulated spray materials or other ingredients at a bottle processing station. The positive locking mechanism of the overhead bottle carriers in the present invention eliminates any possibility of a bottle being dropped until the processing operations are completed and the overhead carrier chain returns the bottles to a discharge platform onto which they are placed for transfer to a downward inclined ramp and thence onto a conntinuous moving exit conveyor. The inclined conveyor belt and the overhead claim shell neck gripping carriers of the present invention function both for picking up bottles to be processed and for discharging finished bottles as they leave the processing station.

OBJECTS OF THE INVENTION

One object of the present invention is to provide an improved horizontal conveyor belt mechanism which is easily adjustable in height whereby bottles or other containers of varying types may be carried up an inclined ramp and delivered to a continuously moving horizontal portion of the same continuous belt.

Another object of the invention is to eliminate dead space between an inclined conveyor belt and a horizontal conveyor belt.

A further object of the invention is to provide such a continuous conveyor belt which is quickly and easily varied in height beneath an overhead conveyor to accommodate bottle containers of differing heights.

An additional object of the invention is to provide an improved overhead bottle carrier in combination with the improved continuous horizontal conveyor belt structure of the invention whereby bottles received at random on the conveyor belt are automatically uniformly spaced and successively engaged by positive locking overhead carriers.

Another object of the invention is to provide improved overhead neck gripping bottle carriers with a positive gripping lock and an integral shield for protecting both the bottle neck and the gripping mechanism from any processing materials to which the bottles may be subjected.

Still another object of the invention is to provide a mechanism embodying the objects hereinbefore set forth which is usable both for receiving bottles at random and transporting them through a processing station and then for discharging bottles after processing.

Other objects of the invention will in part be obvious and will in part appear hereinafter.

For a fuller understanding of the nature and objects of the invention, reference should be had to the following detailed description taken in connection with the accompanying drawings, in which:

FIG. 1 is a top plan view of a complete conveyor system according to the invention including an input station, a spray station and a discharge station;

FIG. 2 is a vertical front view of the input and spray station portions of the system disclosed in FIG. 1;

FIG. 3 is a vertical side view of the discharge station of the system shown in FIG. 1 of the drawings and taken along the line 3—3 of FIG. 1;

FIG. 4 is an enlarged detail front elevation view of the input station of the invention showing the adjustable height means for the continuous conveyor belt and the inter-relation between the overhead carrier system and the synchrodrive coupling the same to the horizontal belt conveyor;

FIG. 5 is a detailed top sectional view taken along the line 5—5 of FIG. 4;

FIG. 6 is a detailed sectional view taken along the line 6—6 of FIG. 4, showing a bottle on the horizontal conveyor belt and engaged by the overhead carrier;

FIG. 7 is a further detailed sectional view taken along the line 7—7 of FIG. 4 and showing a bottle just before it is engaged by the overhead clam shell carrier;

FIG. 8 is an enlarged side elevational view showing the relationship between a bottle and the overhead carrier aligned therewith just before the clam shell grips the bottle neck; and FIG. 9 is an enlarged detailed elevation similar to FIG. 8 showing the overhead carrier in its lowered position surrounding and engaging the neck of a bottle in positive locked condition.

FIG. 10 is a detailed top view of a sprocketed rotatable carrier engaged with a stationary rack.

DETAILED DESCRIPTION

Reference is now made in greater detail to FIG. 1 of the drawings which is a top plan view of a complete system incorporating the invention. It will be seen that bottles randomly spaced upon a horizontal conveyor 10 are passed to the lower end of inclined ramp conveyor belt 11 and upon transfer thereto are moved upward through an inclined ramp portion 12 to an elevated horizontal platform portion 14 at which they are engaged by individual bottle grippers on the overhead chain conveyor 15. The bottles thus engaged by the overhead carrier chain 15 are transported from right to left in FIG. 1 through a spray station indicated generally at 16 where the overhead bottle carriers engage a horizontal rack to impart rotation to each bottle as it progresses through station 16 while a suitable spray coating may be applied to the exterior of the bottles. From spray station 16 the overhead carrier progresses through a 90° turn 17 and a second 90° turn 18 to a bottle release and declining ramp discharge station 19 where the bottles are gently deposited upon a horizontal moving belt, the overhead clam shell carriers are released, and the released bottles then progress from left to right in FIG. 1 down the inclined portion of the horizontal conveyor 20 to a discharge conveyor 22 which carries the finished and processed bottles on to filling or other operations. Meanwhile the overhead conveyor chain now progresses through another 90° turn at 21 and a further 90° turn at 22 until it is brought back to a 180° turn at 23 where the overhead conveyors are again aligned with the incoming conveyor belt 10.

Referring now more particularly to FIG. 2 of the drawings which is a front elevation view of the input inclining ramp and bottle gripping station and the spray station shown in plan view in FIG. 1, it will be seen that the randomly spaced incoming bottles indicated generally at 25 proceed beneath the overhead carrier members, indicated generally at 26, on the overhead carrier 15 until they reach the foot of the inclined ramp portion 12 of the input station whereupon they are elevated to the horizontal platform portion 14 at which point the overhead carriers are initially raised into open position by riding up and over a cam 27 and then, at the left hand end of the moving horizontal platform 14, the overhead carriers roll off of cam member 27 and drop into locking engagement around the successive bottles. From this point on, moving from right to left, the bottles are suspended by the overhead carrier 15 and are carried through the spray station 16 where spray coating is applied to the bottles. Thereafter the bottles progress from right to left around two bends, as shown in FIG. 1, during which period of transit the applied coating dries before the bottles reach the bottle release and declining ramp discharge station 19 as shown in FIG. 1.

Referring now to FIG. 3 of the drawings, it will be seen that upon arrival at the bottle release and declining ramp discharge station 19, the bottles in their overhead carriers are deposited upon a horizontal moving belt portion 30 and when the overhead carrier members engage overhead cam 31 they are successively elevated thereby into bottle releasing position whereupon the released bottles proceed down the inclined discharge ramp 32 until they are deposited upon the continuously moving discharge conveyor belt 22. The details of the inclined ramp and horizontal platform continuously moving belt structure of the invention will now be described in greater detail with reference to FIG. 4 of the drawings.

Referring now to FIG. 4, a continuous belt 34 passes over a rotatable lower roller 35 and moves from right to left as viewed in FIG. 4 to pass over upper rollers 37 and 38 and then downwardly beneath lower roller 36 and back around end roller 35. The upper roller 37 is pivotally supported between the upper end of a first inclined rigid frame linkage 39 and a horizontally extending rigid frame linkage 40, the left end of which supports the axle 42 of roller 38 and is pivotally engaged thereat with a second inclined rigid frame linkage 44, the lower end of which is pivotally supported on the axle 46 of lower roller 36. The lower rollers 35 and 36 have their horizontally disposed axles 45 and 46 rotatably supported upon a horizontal stationary frame 47 which in turn is fixedly supported at a convenient preselected working height by vertical stanchion supports 48, 49 and 50 mounted upon the floor 51. Horizontal frame linkage 40 is mounted upon and supported by a pair of vertically adjustable jack supports 52 and 54, the lower ends of which are secured to the horizontal stationary frame member 47. By raising or lowering the jacks 52 and 54, the level of the horizontal member 40 may be adjusted to accommodate bottles of differing heights. As the horizontal linkage 40 is raised by operation of jacks 52 and 54, the angle of elevation of the inclined ramp portion 12 of the continuous conveyor belt is also increased. Inasmuch as the jack members 52 and 54 are flexibly coupled to the horizontal frame member 40, as they are raised the frame member 40 moves slightly to the right as viewed in FIG. 4 while the length and tension of the continuous belt 34 remains constant. Similarly if the jacks 52 and 54 are lowered, the rigid coupling between the parallelogram frames 39, 40 and 44 causes the horizontal linkage 40 to move slightly to the left while the portion of the belt 34 between rollers 37 and 38 remains horizontal. An upper motor 56 drives the overhead conveyor chain, and by coupling through a synchrodrive 57 also drives the variable pitch horizontal spacing screw 58 at a rate to maintain horizontal motion of bottles guided thereby at exactly the same speed of lateral motion imparted to the overhead bottle carriers at the bottle pickup station. Spring tensioning means 59 mounted on the overhead chain supporting rack 53 maintains uniform tension in the overhead chain at all times whereby the spacing between adjacent overhead bottle carriers is maintained constant.

In FIG. 5, which is a top plan view of the loading platform comprising the inclined ramp portion and the horizontal platform portion of the continuous conveyor belt 34, taken along the line 5—5 of FIG. 4, the variable pitch horizontal bottle spacing screw 58 may be seen more clearly. Screw 58 is driven by a motor 60 through a right angle gear reduction transmission unit 61 and a timing belt 62. The horizontal conveyor belt drive motor 55 and the screw drive motor 60 are both connected to the synchrodrive 57 (FIG. 4), as is also the overhead chain drive motor 56, whereby bottles which are uniformly spaced beneath the overhead bottle carriers 26 are moved in synchronism therewith at the time overhead carrier is dropped onto engagement with a bottle neck therebeneath.

FIG. 6, which is a vertical sectional view taken along the line 6—6 of FIG. 4, shows the relation between a bottle 25 onto which the overhead carrier 26 has just been lowered, the conveyor belt 34, and the variable pitch spacing screw 58. As shown by FIG. 6 a horizontal guide rail 64 holds bottles at this position firmly against the helical surface of screw 58. The arrangement of horizontal linkages 40—40 and inclined frame linkages 44—44 and shaft 42 on which both linkages are pivotally supported is also shown by FIG. 6. The inner pair of horizontal C beam linkages 40—40 support the horizontal guide rail 64 and the horizontal spacing screw 58. Attached to the bottom end of horizontal beams 40—40 is a horizontal bearing plate 65 which rests upon the upper end of vertical jack shaft 54 (shown broken away in FIG. 6) while the hydraulic jack 66 is rigidly secured to the horizontal stationary frame 47—47.

Referring now to FIG. 7, which is a vertical sectional view taken along the line 7—7 of FIG. 4, it may be seen that before the bottles 25 come into engagement with the helical surface of horizontal spacing screw 58 they are guided by a rear horizontal guide rail 43 parallel to front guide rail 64 whereby the bottles are maintained in a uniformly straight row on the conveyor belt 34. Also, as shown in this view, the overhead bottle carrier 26 is raised on vertical shaft 67 by engagement of roller 68 with the elevated surface of cam 27. In this elevated condition the jaws 69—70 of overhead bottle carrier 26 are swung open as shown. As also shown in FIG. 7, a pluality of idler rollers such as 71 and 72 are mounted on horizontal platform channel members 40—40 to support horizontal conveyor belt 34, thereby providing a continuous horizontal platform between rollers 37 and 38 as shown in FIG. 4. As shown in FIGS. 6 and 7 the overhead conveyor track 53 is of a conventional form having parallel inturned bottom flanges 63—63 on which internal rollers 73 travel while depending shaft supports 74 travel through a longitudinal slot 75 between flanges 63—63.

Reference is now had to FIG. 8 and FIG. 9 which show in greater detail the construction and operation of the overhead bottle carriers which are a feature of the present invention. In conventional manner a pair of horizontal guide rollers 75—75 are mounted on a vertical shaft 76 supported between a pair of rigid horizontal links 77—77. A pair of vertically depending rods 74—74 are secured to opposite ends of links 77—77 and extend downwardly through the longitudinal slot between chain links 78. Pivotally mounted on the upper ends of rods 74, between rigid links 77—77, are chain links 78 which carry the load supporting rollers 83. Additional chain links may be connected between adjacent roller carrying links 78 if it is desired to provide a greater spacing between adjacent individual bottle carriers 26.

Still referring to FIGS. 8 and 9, a horizontal bar 79 is rigidly secured to vertical rods 74—74 and supports in the center thereof a vertical shaft 67 which is rotatably but not slidably mounted to a central bore in bar 79. A second horizontal bar 81 is slidably mounted on vertical rods 74 beneath bar 79 and carries cam follower 68. A hollow tubular sleeve 82 is slidably mounted on vertical shaft 67 which passes freely through a central bore in bar 81. A lock nut and washer 84 are affixed to the upper end of sleeve 82 to engage the upper surface of bar 81 whereby the sleeve 82 is slidably raised on shaft 67 when the roller 68 rides up on cam surface 27 as shown in FIG. 8. Concentrically affixed to the bottom end of sleeve 82 is a rotatable wheel 85 which is preferably toothed around it periphery. Concentrically mounted on the bottom flange of wheel 85 is a vertically depending hollow cylinder 86 which performs the dual functions of opening and closing the bottle gripping members and also serves to protect the bottle gripping mechanism from spray coatings or other deleterious processing materials. The bottom 87 of cylinder 86 is formed with a concentric annular opening 88 through which bottle gripping members 69 and 70 extend. The bottle gripping members 69 and 70 are each identical semi-cylindrical elements pivotally mounted on a common horizontal pin 89 which extends through opposite arms of a U-shaped yoke 90 affixed to the bottom end of vertical shaft 67. Affixed to the upper ends of each of the bottle gripping members 69 and 70 is a lateraly extending arm 91 on the bottom surface of which is mounted a rounded pin 92. When the surrounding cylinder 86 is raised, by engagement of roller 68 with cam surface 27 as shown in FIG. 8, the pins 92 are engaged by the upper surface of cylinder bottom 87 thereby causing the bottle gripper members 69 and 70 to swing outwardly as shown in FIG. 8 into a position of disengagement with bottles therebeneath.

Referring now more particularly to FIG. 9 of the drawings the condition of the overhead bottle carriers, indicated generally at 26, when in the closed bottle gripping position will be described. As the roller 68 descends the inclined surface of cam member 27 the bar 81, sleeve 82 and cylinder 86 are lowered thereby causing the bottom 97 of cylinder 86 to descend around the champfered surfaces 93—93 and to close the semi-cylindrical bottle grippers 69 and 70. When the carrier 26 reaches its lowermost position, with roller 68 completely disengaged from cam surface 27 as shown in FIG. 9, the horizontal bar 81 rests upon and is supported by stop collars (or lock nuts) 94 affixed to the lower ends of vertical rods 74. At this position the bottom plate 87 of cylinder 86 completely surrounds the outermost cylindrical surface of closed semi-cylindrical members 69—70 and, by reason of the limited annular clearance 88 therebetween, the closed members are effectively and securely locked in their closed bottle gripping condition. Inner annular rims 95—95 formed in the bottom ends of the semi-cylindrical members 69–70 lock under the outer rim lip 96 of bottles gripped by members 69–70 in their closed condition to provide a completely secure positive lock on the bottle necks. Because of the positive locking engagement afforded by the limited annular opening 88 in the bottom 87 of cylinder 86 surrounding the outside surfaces of the closed bottle grippers, as shown in FIG. 9, it is impossible for a bottle to become disengaged from its overhead carrier by any amount of swinging, rocking or bumping which may be encountered in transit. As also shown in FIG. 9, a vertical pin 97 is preferably passed through the hollow cylinder 86, between the top wheel 85 and the bottom surface 87 to limit relative rotation between the outer cylinder 86 and the inner bottle gripping members 69–70. By this means when the wheel 85 is rotated by engagement with the horizontal rack 98 at processing station 16 (FIG. 1 and FIG. 2) a bottle held by the overhead carrier is caused to rotate about its vertical axis, thus assuring even and uniform application of sprayed processing materials.

Thus it will be seen that the improved overhead bottle gripping movable carrier illustrated by the drawings, and more particularly as described with reference to FIGS. 8 and 9 thereof, provides a simple relatively inexpensive and wholly reliable mechanism for transporting bottles or similar containers from a pick-up station (as shown in FIG. 4) through a processing station (as shown in FIGS. 1 and 2), and to a discharge or delivery station (as shown in FIGS. 1 and 3). The toothed or sprocketed rim of wheel 85 is adapted to engage with a horizontally mounted linear toothed rack 98 at a processing station, such as the spray station indicated generally at 16 in FIGS. 1 and 2, whereby rotation is imparted to cylinders 86 and the locked bottle grippers 69–70 causing bottles gripped thereby to be rotated about the vertical axis of shaft 67 (which coincides with the concentric vertical axis of bottles engaged by the overhead carrier 26). In this manner uniform spray coatings may be applied automatically to the external surfaces of bottles by the present invention. Also, as mentioned above, the enclosed rotating cylinder 86 completely covers the moving parts (and especially the pivotal axis 89) of the bottle gripping members so that the mechanism does not become contaminated or clogged by accumulated deposits of sprayed materials.

The continuously moving adjustable height conveyor belt in combination with the variable pitch horizontal spacing screw, both of which are synchronized with the overhead carrier chain drive, cooperate with the unique positively locking clam shell neck grippers to provide a continuously operable system for receiving randomly positioned bottles, aligning, elevating and uniformly spacing them, transferring bottles thus aligned and spaced from a bottom supporting conveyor belt to uniformly spaced individual overhead bottle carriers, processing the bottles by spray or otherwise without fouling the conveyor mechanism, and then delivering and releasing the processed bottles to a continuously moving bottom support conveyor — all without risks of breakage or surface marring of the finished bottle containers.

It will be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. For use in an overhead conveyor system for transporting bottles or like containers from an input station through a processing station to a discharge station, a neck-gripping container carrier comprising in combination, a pair of symmetrical semi-cylindrical neck-gripping members pivotally mounted along a central upper edge to a common horizontal axis, a vertically extending shaft, yoke means symmetrically supporting said pivotal axis at the bottom end of said vertically extending shaft, means rotatably mounting the upper end of said shaft for rotation about its vertical axis, means supporting and guiding said shaft mounting means to depend vertically from an overhead movable chain, a hollow tubular member slidably mounted on said vertical shaft, a bail slidably mounted on said vertical supporting and guiding means and receiving said hollow tubular member rotatably through a central bore thereof, a cam follower mounted on said bail and said hollow tubular member may be raised and lowered by engagement with a cam, a horizontally disposed wheel concentrically mounted on the bottom end of said tubular member and rotatable therewith about the axis of said vertical shaft, said shaft passing freely through an axial bore of said wheel, a hollow cylinder depending concentrically from the bottom of said wheel and surrounding said yoke and the upper portion of said neck-gripping members, a plane bottom wall of said cylinder having a central bore to receive and encircle said neck-gripping semi-cylindrical members in their closed position, laterally extending lever arms secured to the upper ends of said semi-cylindrical gripping members and protruding beyond the diameter of said bottom wall central bore with said surrounding depending hollow cylinder, whereby said lever arms engage the inner surface of said bottom wall when said surrounding cylinder is raised by engagement of cam follower and said cam to open said semi-cylindrical members into their non-gripping position.

2. The combination of claim 1 and a toothed periphery formed on said horizontally disposed wheel engageable with a horizontal linear rack for imparting rotation to said wheel and depending cylinder about said vertical shaft as said overhead carrier moves longitudinally thereby.

3. The combination of claim 2 and means limiting relative rotation between said depending cylinder and said neck-gripping semi-cylindrical members whereby rotation is imparted to containers suspended thereby.

4. An overhead bottle carrier comprising in combination a pair of semi-cylindrical clam shell members adapted to surround and lockably engage the neck of a bottle, a common horizontal pivotal axis supporting both said members along adjacent abutting edges at the upper diameter thereof whereby said members may be swung apart into open nonengaging position, a vertical shaft rotatably supporting said common horizontal axis from an overhead conveyor chain, a hollow cylindrical shield substantially surrounding said members and movable vertically with respect thereto, a lever arm extending laterally within said shield from each of said members, a bottom on said shield engageable with said lever arms for swinging said members about said common horizontal axis into open position when said shield is raised vertically, a coaxial central bore in the bottom of said shield engageable with said members to close the same into locked neck-gripping position when said shield is lowered around said members and a cam follower linkably connected to said shield and engageable with a cam for vertically raising and lowering said shield.

5. The combination of claim 4 wherein said cylindrical shield is slidably mounted on said rotatable vertical shaft.

6. The combination of claim 4 including means for imparting rotation to said cylindrical shield about its vertical axis, and further means for coupling said shield to said closed clam shell neck-gripping members whereby a bottle held thereby may be caused to rotate about it vertical axis.

* * * * *

UNITED STATES PATENT AND TRADEMARK OFFICE
CERTIFICATE OF CORRECTION

PATENT NO. : 3,944,058
DATED : March 16, 1976
INVENTOR(S) : Leopold Strauss

It is certified that error appears in the above-identified patent and that said Letters Patent are hereby corrected as shown below:

Col. 2, line 6, "conntinuous" should read -- continuous --.
Col. 5, line 9, after "time" insert -- each --; line 65, before "greater" delete -- a --. Col. 6, line 13, "it" should read -- its --; line 42, "bottom 97" should read -- bottom 87 --. Col. 8, line 14, after "bail" and before "and" insert -- whereby said bail --; line 32, "of cam" should read -- of said cam --. Col. 10, line 3, "it" should read -- its --.

Signed and Sealed this eighteenth Day of May 1976

[SEAL]

Attest:

RUTH C. MASON
Attesting Officer

C. MARSHALL DANN
Commissioner of Patents and Trademarks